United States Patent [19]
Wong

[11] Patent Number: 5,818,747
[45] Date of Patent: Oct. 6, 1998

[54] SMALL, FAST CMOS 4-2 CARRY-SAVE ADDER CELL

[75] Inventor: Ming G. Wong, San Jose, Calif.

[73] Assignee: Sun Microsystems, Inc., Palo Alto, Calif.

[21] Appl. No.: 882,364

[22] Filed: Jun. 25, 1997

Related U.S. Application Data

[63] Continuation of Ser. No. 379,186, Jan. 27, 1995, abandoned.

[51] Int. Cl.$^6$ ..................................................... G06F 7/50
[52] U.S. Cl. ............................... 364/784.03; 364/784.04; 364/786.02; 364/786.03
[58] Field of Search ......................... 364/784.03, 784.04, 364/786.02, 786.03

[56] References Cited

U.S. PATENT DOCUMENTS

| | | | |
|---|---|---|---|
| 4,918,640 | 4/1990 | Heimsch et al. | 364/784 |
| 4,920,509 | 4/1990 | Hmida et al. | 364/784 |
| 5,343,418 | 8/1994 | Zinger | 364/784 |

OTHER PUBLICATIONS

Neil H. E. Weste and Kamran Eshraghian, "Principles of CMOS VLSI Design, A Systems Perspective ", Addison-Wesley Publishing Co., pp. 7–8 and 55–56, undated.

Primary Examiner—Tan V. Mai
Attorney, Agent, or Firm—Limbach & Limbach L.L.P.

[57] ABSTRACT

A CMOS 4-2 carry-save adder cell implementation. A XNOR gate is used in the computation of SUM and CARRY. By using an XNOR gate, there are no possible input permutations which will cause any output in the SUM logic to be driven by two P-channel devices in series. The final XOR function needed to compute the SUM output is performed by a 2-to-1 multiplexor and two inverters. The maximum resistance from input to output of the 2-to-1 multiplexor is relatively low, and the worst case is when the CIN input drives through the transmission gate. The input capacitances are very low. The maximum load driven by the output is low because the output never drives through the drains of any transistors. Instead, the output drives only the gates of four transistors to implement the XOR function. A single 8-transistor complex gate and an inverter are used to calculate COUT. The transistors in the complex gate can be made relatively small, thus minimizing the input capacitance. A complex gate is used to implement the logic function ~((IN0 & IN1)+(IN2 & IN3)). The output of this complex gate is double buffered using two inverters. Minimum size transistors for the complex gate further minimize the input capacitances and reduce the area needed to lay out the gate. All the outputs are driven by final inverters to provide strong, clean outputs.

18 Claims, 8 Drawing Sheets

| $C_{IN}$ | A | B | SUM | $C_{OUT}$ |
|---|---|---|---|---|
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

| A | B | SUM | $C_{OUT}$ |
|---|---|---|---|
| 0 | 0 | $C_{IN}$ | 0 |
| 0 | 1 | $\overline{C_{IN}}$ | $C_{IN}$ |
| 1 | 0 | $\overline{C_{IN}}$ | $C_{IN}$ |
| 1 | 1 | $C_{IN}$ | 1 |

| $IN_0$ | $IN_1$ | $IN_2$ | $IN_3$ | CARRY | SUM | $C_{OUT}$ |
|---|---|---|---|---|---|---|
| 0 | 0 | 0 | 0 | 0 | $C_{IN}$ | 0 |
| 0 | 0 | 0 | 1 | $C_{IN}$ | $\overline{C_{IN}}$ | 0 |
| 0 | 0 | 1 | 0 | $C_{IN}$ | $\overline{C_{IN}}$ | 0 |
| 0 | 0 | 1 | 1 | 0 | $C_{IN}$ | 1 |
| 0 | 1 | 0 | 0 | $C_{IN}$ | $\overline{C_{IN}}$ | 0 |
| 0 | 1 | 0 | 1 | 1 | $C_{IN}$ | 0 |
| 0 | 1 | 1 | 0 | 1 | $C_{IN}$ | 0 |
| 0 | 1 | 1 | 1 | $C_{IN}$ | $\overline{C_{IN}}$ | 1 |
| 1 | 0 | 0 | 0 | $C_{IN}$ | $\overline{C_{IN}}$ | 0 |
| 1 | 0 | 0 | 1 | 1 | $C_{IN}$ | 0 |
| 1 | 0 | 1 | 0 | 1 | $C_{IN}$ | 0 |
| 1 | 0 | 1 | 1 | $C_{IN}$ | $\overline{C_{IN}}$ | 1 |
| 1 | 1 | 0 | 0 | 0 | $C_{IN}$ | 1 |
| 1 | 1 | 0 | 1 | $C_{IN}$ | $\overline{C_{IN}}$ | 1 |
| 1 | 1 | 1 | 0 | $C_{IN}$ | $\overline{C_{IN}}$ | 1 |
| 1 | 1 | 1 | 1 | 1 | $C_{IN}$ | 1 |

$$\sum_{n=0}^{N} [2^n SA_n + 2^{(n+1)} CA_n] = A$$

$$\sum_{n=0}^{N+1} [2^n SZ_n + 2^{(n+1)} CZ_n] = Z$$

$$\sum_{n=0}^{N} [2^n SB_n + 2^{(n+1)} CB_n] = B$$

$$A + B = Z \quad N = 4$$

SMALL, FAST CMOS 4-2 CARRY-SAVE ADDER CELL

This is a continuation of application Ser. No. 08/379,186 filed on Jan. 27, 1995, abandoned.

BACKGROUND OF THE INVENTION

1. Field of the Invention

The present invention relates to the field of CMOS carry-save adder cells. Specifically, the present invention relates to 4-2 adder cells optimized for speed and area.

2. Discussion of the Prior Art

The most straightforward approach for the addition of two binary numbers involves the use of a full adder as shown in FIG. 1A. The full adder has three inputs of equal weight, CIN, A, and B. It produces two outputs of unequal weight, SUM and COUT. The SUM output has the same weight as the three inputs; the COUT output is one binary order of magnitude heavier than the SUM output. FIG. 1B shows the truth table for a standard full adder. The arithmetic equation showing the relationships of the inputs and outputs of a full adder follows.

$$CIN+A+B=2*COUT+SUM$$

All variables have the same coefficient of one except the COUT output which has a coefficient of two indicative of its heavier weight.

A structure capable of adding two N+1 bit numbers is constructed by cascading N+1 full adders. FIG. 2 illustrates a structure which adds two five bit numbers. The CIN (Carry In) input for each adder stage is connected to the COUT (Carry Out) output of the stage which is less significant by one binary order of magnitude. The CIN input of the adder which produces the least significant bit of output is hardwired to zero. Because the addition of two N+1 bit numbers can produce an N+2 bit result, the COUT output of the most significant adder provides the most significant bit of the result.

FIG. 1C shows an equivalent representation of the truth table of FIG. 1B. FIG. 1C shows that the COUT output of a full adder is dependent upon the CIN input, at least for some of the possible input permutations. In the worst case for the example shown in FIG. 2, the COUT output (Z5) of the most significant adder 200 is dependent upon the COUT output 201 of the least significant adder 202. For example, this would happen if X were 31, equivalently 11111 in binary, while Y were 1, equivalently 00001 in binary.

The most significant bit of the result Z will not be available until the COUT outputs have "rippled" through the entire row of adders. Each full adder must perform logic to calculate its COUT output. If the propagational delay required to compute the COUT output is T, then the total time required to assure a valid output for the structure of FIG. 2 is (N+1)T. This example illustrates that the time required to compute a sum using the structure of FIG. 2 grows linearly with the number of bits needed to represent the addends. The dotted lines in FIG. 2 illustrate the length of the carry chain propagation.

Using a carry-lookahead technique, the total time required to compute an N+2 bit result can be reduced to T $\log_2$ (N+1) by adding additional hardware. The amount of additional hardware is somewhat less than $\log_2$ (N+1) times the amount of hardware shown in the scheme of FIG. 2. However, the computation time using carry-lookahead techniques still increases as the number of bits needed to represent the inputs increase. In modern processors, each input may be represented by as many as 128 bits. Even using carry-lookahead techniques, both the propagation delay and the amount of additional hardware are unacceptably large.

In order to solve the problems of time-consuming carry propagation and excessive hardware costs, the carry-save format for data representation has been introduced. Using the carry-save format, each number is represented by two separate quantities—a carry portion and a sum portion. The number being represented is the sum of the carry and sum portions. Using the carry-save scheme, each number has many equivalent yet different representations; however, using the standard representation scheme, each number has only one representation. The advantage of the carry-save format is that arithmetic operations on the number can be performed in a constant amount of time regardless of the size of the operands. If the standard format representation of a number is desired, a carry-lookahead or ripple-carry addition of the sum and carry portions of the number is performed. The number represented by the sum and carry is computed as follows: X=SUM+2*CARRY. This conversion from carry-save format to standard format does involve a carry propagation, but it only occurs once, rather than each time an operation using the number is performed.

FIG. 3A shows a 4-2 carry-save adder. The 4-2 carry-save adder takes four input bits from the addends (IN0, IN1, IN2, and IN3) and produces two output bits (SUM and CARRY) —hence the name "4-2" adder. By this nomenclature, a standard full adder is a "2-1" adder. The 4-2 carry-save adder additionally takes a CIN input and produces a COUT output. The arithmetic equation representing the relationship between the inputs and outputs of a 4-2 carry-save adder cell follows.

$$CIN+IN0+IN1+IN2+IN3=2*[CARRY+COUT]+SUM$$

As illustrated by the above equation, all the inputs and the SUM output are weighted equally, while the CARRY and COUT outputs are weighted one binary order of magnitude greater.

The key feature of the 4-2 carry-save adder is easily ascertained by referring to FIG. 3B; the COUT output is not dependent upon the CIN input. Thus, a series of 4-2 carry-save adders can be cascaded as shown in FIG. 4 without any rippling of the carry chain. Since the COUT output is only dependent upon the inputs, COUT is not dependent upon CIN; therefore, no rippling of the carry chain occurs. The dotted lines in FIG. 4 illustrate the length of the carry propagation, which is constant, regardless of the number of bits in the addends.

Cascading two full adders as shown in FIG. 5 is one way to implement a 4-2 carry-save adder. However, the logic in two cascaded full adders is overly complex. Therefore, a 4-2 carry-save adder implemented in this way is too large, and the delay incurred in computing the outputs is too long.

Using the logic equations for a standard full adder, the logic equations for a 4-2 carry-save adder can be derived. These somewhat optimized logical relationships are as follows.

```
INPUTS:     IN0, IN1, IN2, IN3, CIN
OUTPUTS:    SUM, CARRY, COUT
   SUM = IN0 ⊕ IN1 ⊕ IN2 ⊕ IN3 ⊕ CIN
   CARRY = (IN0 ⊕ IN1 ⊕ IN2 ⊕ IN3) & CIN +
      ~(IN0 ⊕ IN1 ⊕ IN2 ⊕ IN3) &
      (IN0 & IN1 + IN2 & IN3)
   COUT = (IN0 + IN1) & (IN2 + IN3)
```

FIG. 6 shows a typical prior art circuit which implements the above logic equations, and thus can be used as a 4-2 carry-save adder.

The standard prior art implementations of a 4-2 carry-save adder cell are not optimal in terms of speed or size. The standard CMOS implementation of the two input XOR function is the 6-transistor cell shown in FIG. 8A. If all of the geometric parameters of a P-channel device and an N-channel device are the same, the P-channel device has a resistance approximately twice that of the N-channel device. If three 6-transistor XOR gates such as shown in FIG. 8A are used to implement the three XOR gates 601, 602, and 603 shown in FIG. 6, then it is possible that the output 604 of XOR gate 603 will be driven by two highly resistive P-channel devices (801 in FIG. 8A) in series. For example, this would happen if IN0=IN1, IN2=0, and IN3=1. In this case, since IN3 is driven by a P-channel device from the previous stage, the output 604 will be driven by at least three P-channel devices in series. Three P-channel devices in series is very highly resistive, and the rise time of output 604 will be too long.

SUMMARY OF THE INVENTION

The present invention is a CMOS 4-2 carry-save adder implementation. The first significant advantage is the use of a XNOR gate in the computation of SUM and CARRY. By using an XNOR gate, there are no possible input permutations which will cause any output in the SUM logic to be driven by two P-channel devices in series. The worst case occurs when one P-channel device is in series with one transmission gate.

The second significant advantage of the present invention is that the final XOR function needed to compute the SUM output is performed by a 2-to-1 multiplexor and two inverters. One advantage of using the 8-transistor XOR implementation is that the maximum resistance from input to output of the multiplexor is relatively low. Using a 2-to-1 multiplexor XOR implementation, the worst case occurs when the CIN input drives through the transmission gate. This transmission gate is less resistive than a single P-channel (or single N-channel device).

A second advantage to using the 8-transistor XOR implementation is that the input capacitances are very low. By using an 8-transistor implementation, the maximum load driven by the output of the XNOR gate is low because the output of the XNOR gate never drives through the drains of any transistors. Instead, the output of the XNOR gate drives only the gates of four transistors.

A third significant advantage to the present invention is that a single 8-transistor complex gate and an inverter are used to calculate COUT. Because an inverter drives the output COUT, the transistors in the complex gate can be made relatively small, thus minimizing the input capacitances.

A fourth significant advantage of the present invention is that a complex gate is used to implement the logic function ~((IN0 & IN1)+(IN2 & IN3)). The output of this complex gate is double buffered using two inverters. Double buffering allows the signal strength to be increased by the inverters while still using minimum size transistors for the complex gate itself. Minimum size transistors for the complex gate further minimize the input capacitances and reduce the area needed to lay out the gate.

All the outputs are driven by final inverters to provide strong, clean outputs.

DETAILED DESCRIPTION OF THE INVENTION

Figures 1A, 1B, 1C:
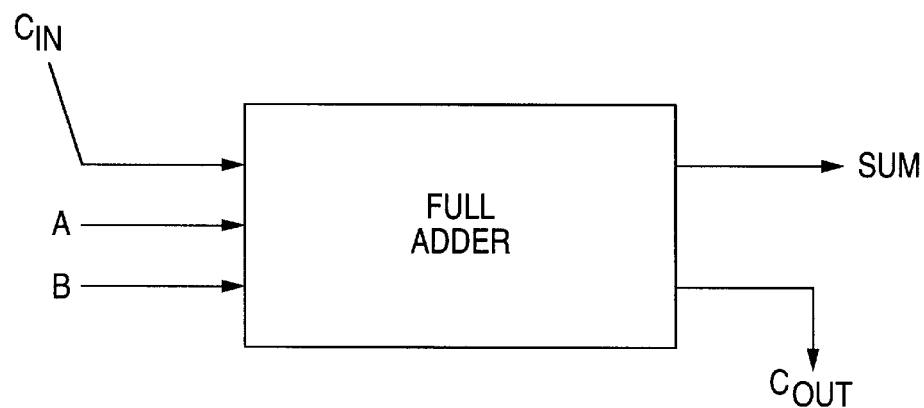
FIG. 1A shows a standard prior art full adder cell.
FIG. 1B is the truth table for a standard prior art full adder cell.
FIG. 1C is another truth table for a standard prior art full adder cell.
Figure 2:
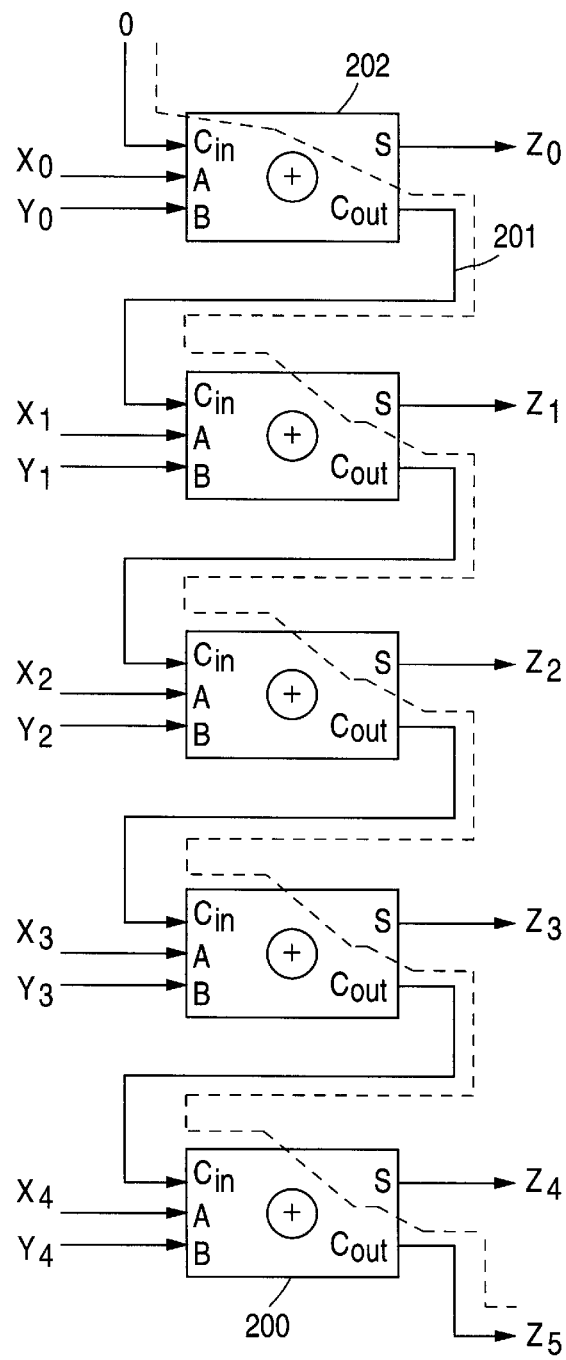
FIG. 2 illustrates the structure of a standard prior art five-bit ripple carry adder.
Figures 3A, 3B:
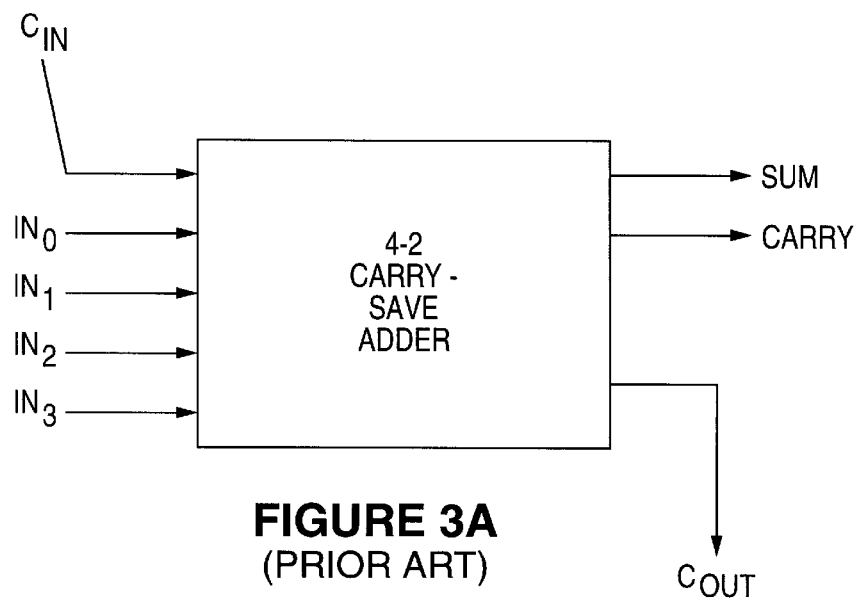
FIG. 3A shows a standard prior art 4-2 carry-save adder cell.
FIG. 3B shows the truth table for a standard prior art 4-2 carry-save adder cell.
Figure 4:
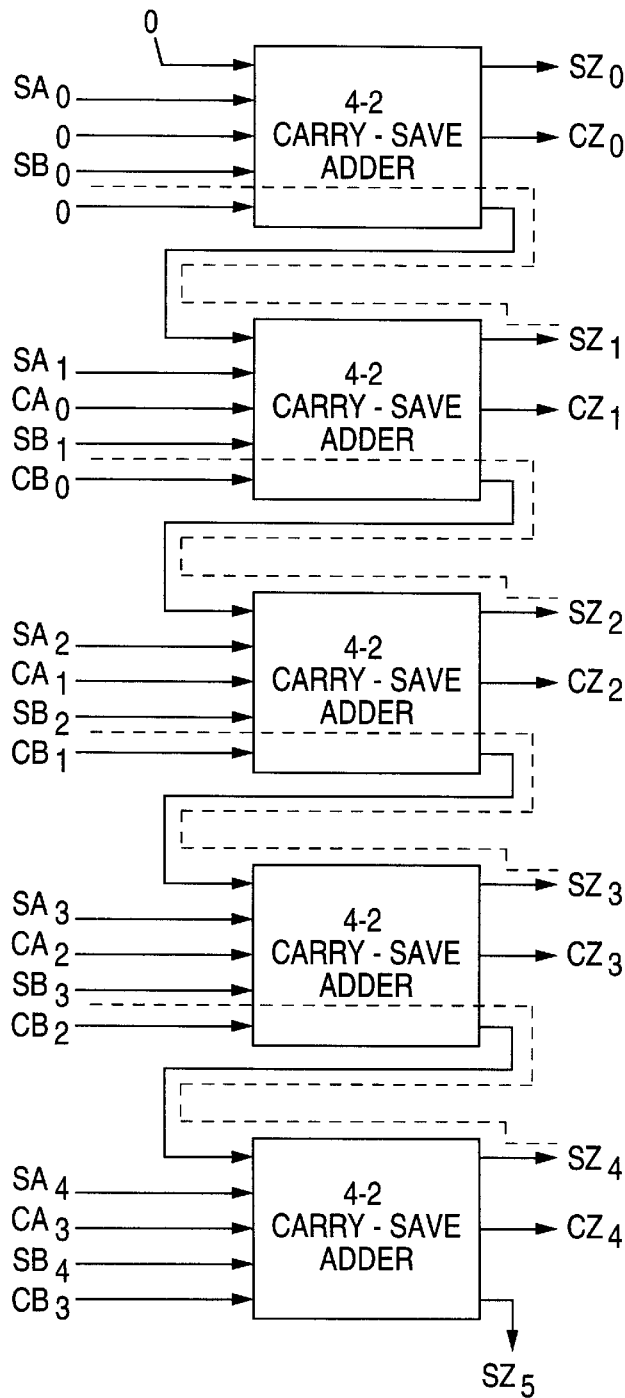
FIG. 4 is illustrates the structure of a standard prior art five-bit carry-save adder.
Figure 5:
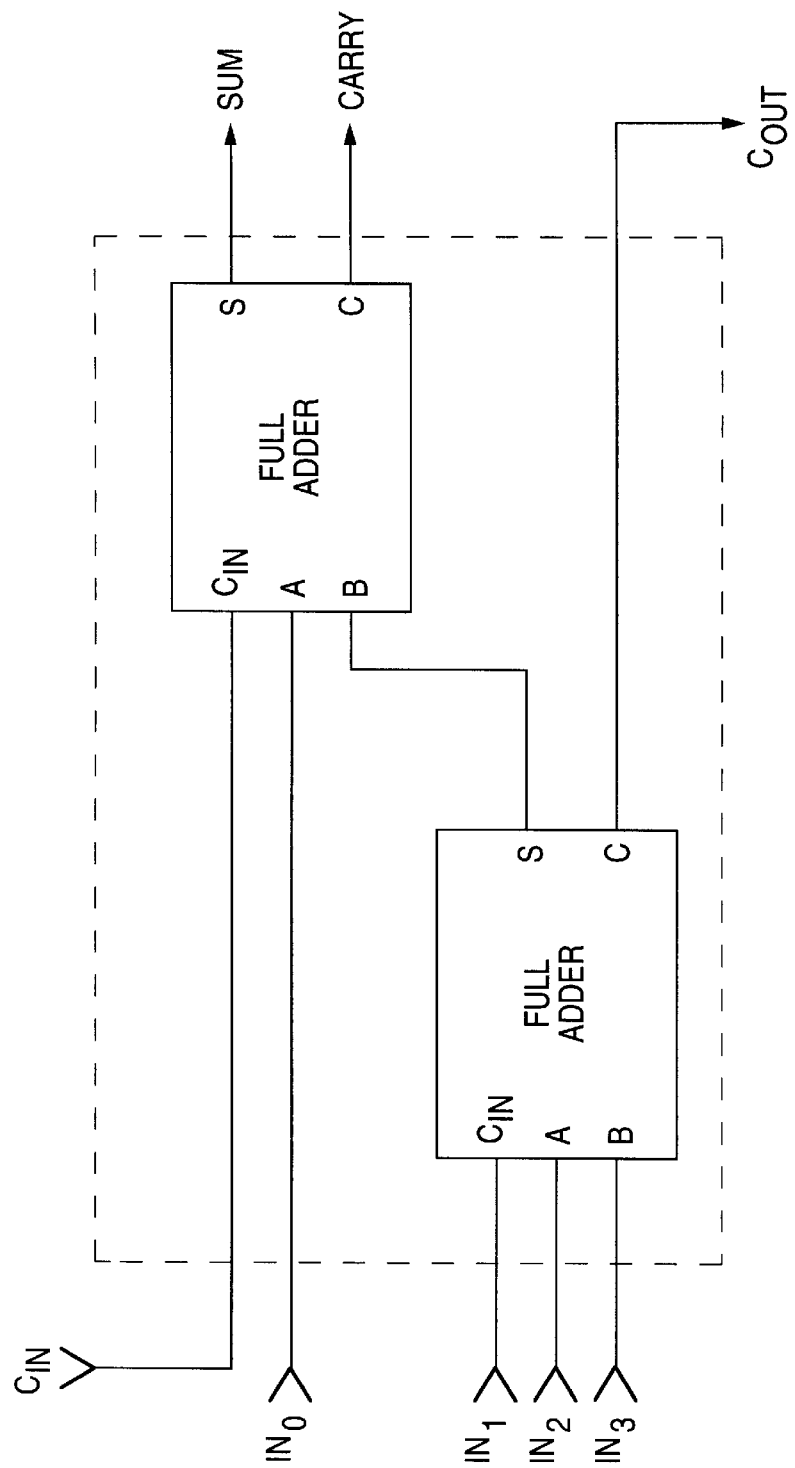
FIG. 5 shows one prior art way to implement a standard 4-2 carry-save adder cell.
Figure 6:
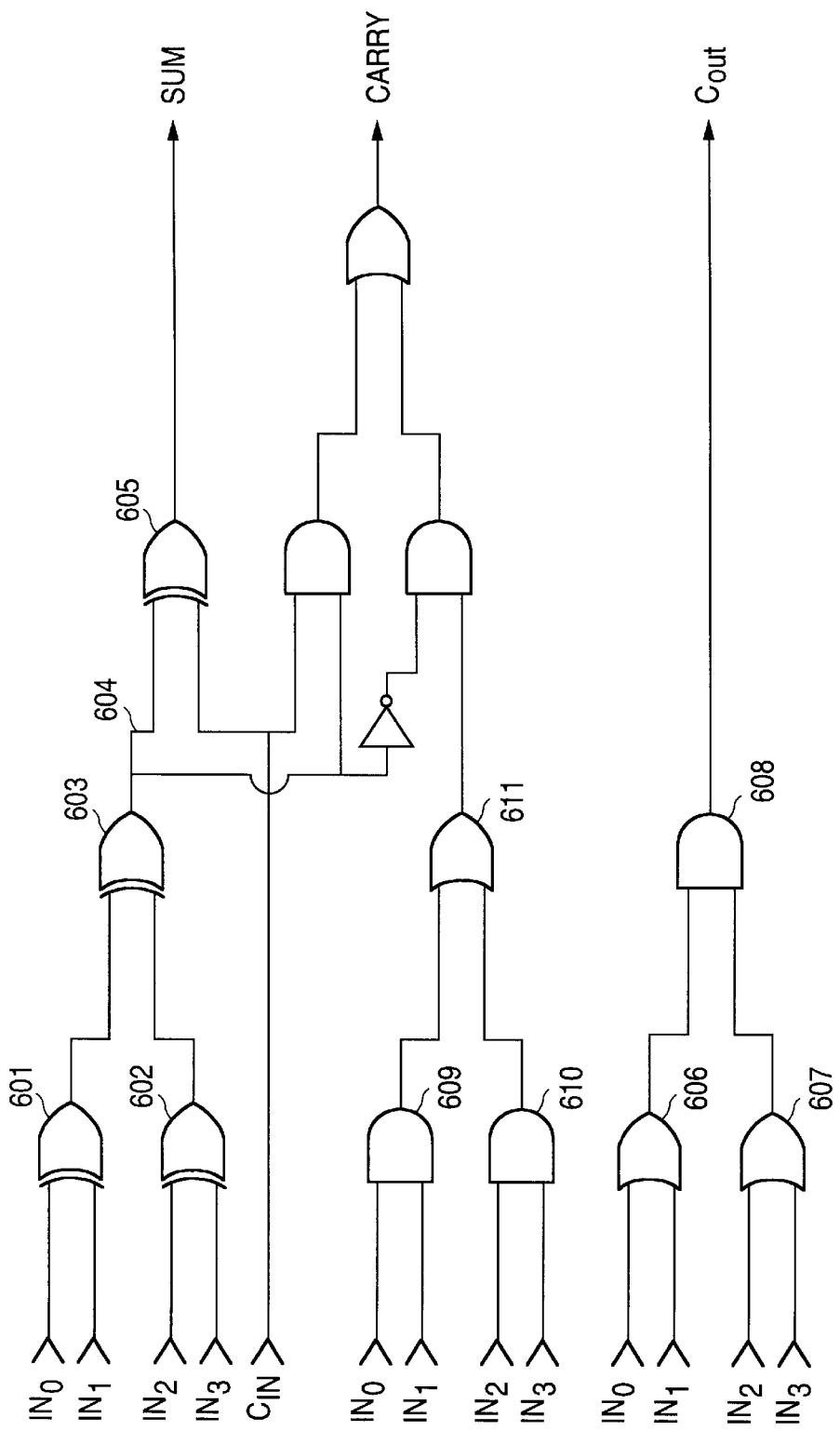
FIG. 6 illustrates a prior art implementation of a standard 4-2 carry-save adder cell.
Figure 7:
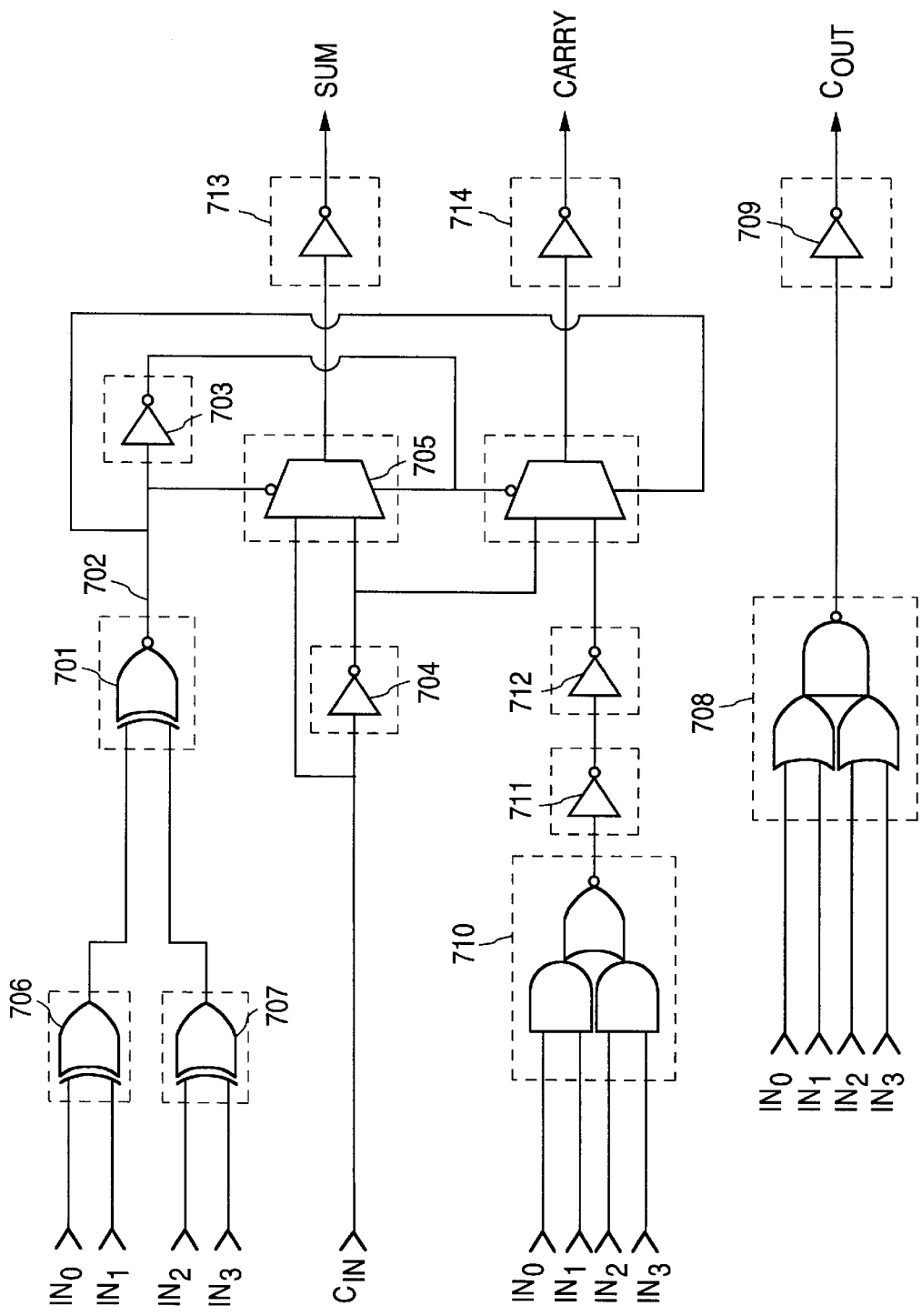
FIG. 7 illustrates the implementation of a standard 4-2 carry-save adder cell according to the present invention.

According to the present invention, the logic equations for the 4-2 carry-save adder are implemented as illustrated in FIG. 7. When the cell is constructed using CMOS, each of the elements surrounded by dotted lines in FIG. 7 is implemented as shown by a corresponding circuit as shown in FIG. 8. There are several reasons why the implementation shown in FIG. 7 is superior to the standard implementation shown in FIG. 6.

According to the present invention, the first significant advantage is the use of a XNOR gate 701 (in FIG. 7) rather than an XOR gate 603 in the computation of SUM and CARRY. The standard CMOS implementation of the two input XNOR function is the 6-transistor cell shown in FIG. 8B. By using an XNOR gate 701 instead of an XOR gate 603, there are no possible input permutations which will cause the output 702 to be driven by two P-channel devices in series. The worst case in FIG. 7 occurs when one P-channel device 801 is in series with one transmission gate 802. This happens, for instance, when IN0=0, IN1=1, and IN2≠IN3. Since a transmission gate has a lower resistance than a P-channel device, the maximum rise time of output 702 will be smaller than that of output 604 if all other factors are the same. In the present invention, the remaining logic in the SUM and CARRY calculations is adjusted to compensate for the fact that the output 702 is the logical inverse of its corresponding output 604 in the prior art.

Figure 8F:
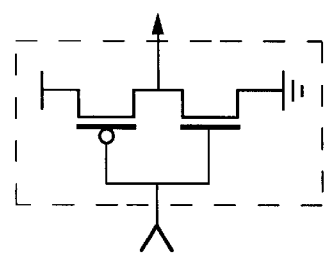
FIG. 8F shows the 2-transistor CMOS inverter implementation used in a standard 4-2 carry-save adder cell according to the present invention.
Figure 8D:
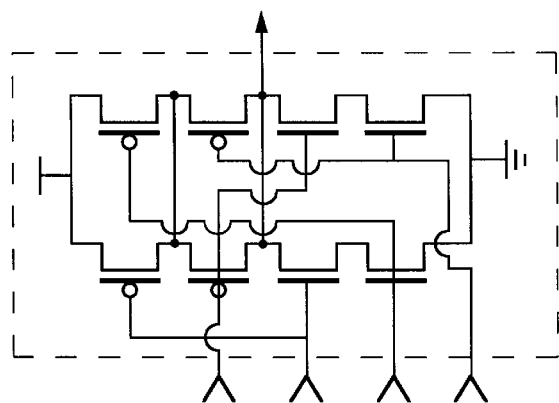
FIG. 8D shows the 8-transistor CMOS complex gate implementation for ~((IN0 & IN1)+(IN2 & IN3)) used in a standard 4-2 carry-save adder cell according to the present invention.
Figure 8B:
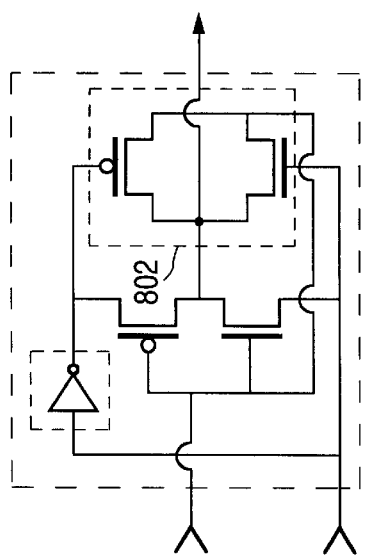
FIG. 8B shows the 6-transistor CMOS XNOR implementation used in a standard 4-2 carry-save adder cell according to the present invention.
Figure 8C:
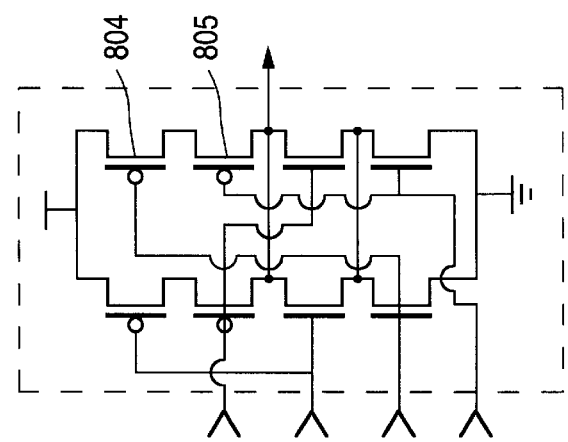
FIG. 8C shows the 8-transistor CMOS complex gate implementation for ~((IN0+IN1) & (IN2+IN3)) used in a standard 4-2 carry-save adder cell according to the present invention.

The second significant advantage of the present invention is that the final XOR function needed to compute the SUM output (605 is FIG. 6) is performed by a 2-to-1 multiplexor 705 and two inverters 703 & 704 rather than a standard 6-transistor XOR gate. The standard CMOS implementation of a 2-to-1 multiplexor is shown in FIG. 8E. A standard inverter implementation is shown in FIG. 8F. By using a multiplexor 705 and two inverters 703 & 704, an 8-transistor XOR implementation is derived.

One advantage of using the 8-transistor XOR implementation rather than a standard 6-transistor implementation is that the maximum resistance from input to output of the multiplexor is again decreased. Using a 2-to-1 multiplexor XOR implementation, the worst case is when the CIN input drives through the transmission gate 803. This transmission gate is less resistive than a single P-channel (or single N-channel device) which would be driven if a 6-transistor XOR (or XNOR) gate were used.

A second advantage to using the 8-transistor XOR implementation is that the input capacitances are significantly reduced as compared to the 6-transistor XOR gate. By using an 8-transistor implementation, the maximum load driven by output 702 is lower than that of its 6-transistor counterpart because output 702 never drives through the drains of any transistors. Instead, output 702 drives only the gates of four transistors to implement the XOR function. If a 6-transistor XOR implementation is used for the XOR gate, then in the worst case, the output 702 must drive at least four gates plus three sources and three drains or at least five gates plus one drain and four sources, depending upon which input to the XOR gate 605 it is connected to.

The reduction of input capacitances is important because the output 702, representing the computation of ~((IN0⊕IN1)⊕(IN2⊕IN3)), is shared between the SUM and CARRY computations. Thus, the fanout of XNOR gate 701 is larger than the fanout for XOR gates 706 & 707.

A third advantage to the present invention is that a single complex gate 708 and an inverter 709 are used to calculate COUT, rather than three simple two-input gates 606, 607, & 608. The CMOS implementation of the complex gate 708 is shown in FIG. 8C. This implementation only requires ten transistors rather than twelve required by three two-input NOR gates. Furthermore, the complex gate 708 and inverter 709 have the same number of transistor delays (3) from input to output, while still only having two P-channel devices in series, as is also the case with a three two-input NOR implementation. If three two-input NOR gates are used, the final NOR gate must be made of larger transistors to achieve the same drive strength as can be derived using relatively smaller transistors in inverter 709. This is a consequence of the fact that a NOR gate has two P-channel devices in series which limits the rise time; however, an inverter made of the same size transistors will have a rise time approximately half that of the NOR gate. Because the inverter 709 drives the output COUT, the transistors in the complex gate 708 can be made relatively small, thus minimizing the input capacitances.

A fourth advantage of the present invention is that a complex gate 710 is used to implement the logic function ~((IN0 & IN1)+(IN2 & IN3)), rather than two levels of NAND gates 609, 610, & 611. The CMOS implementation of the complex gate 710 is shown in FIG. 8D. The output of this complex gate 710 is double buffered using two inverters 711 & 712. Double buffering allows the signal strength to be increased by the inverters 711 & 712 while still using minimum size transistors for the complex gate 710 itself. Even the P-channel devices in the complex gate 710 are made the minimum size. The slower rise time relative to the fall time from the complex gate 710 is compensated by a slower fall time relative to the rise time in the first inverter 711. Minimum size transistors for the complex gate 710 further minimize the input capacitances and reduce the area needed to lay out the gate. Double buffering is preferable to single buffering because, if only one inverter buffer were used on the output of the complex gate 710, the complex gate 710 must implement a different logic function which would require the logical inverses IN0, IN1, IN2, and IN3, thus requiring additional inverters to provide the proper inputs. Furthermore, this logic is not in the critical path, thus the extra inverter delays do not adversely affect performance.

According to the present invention, all the outputs are driven by final inverters 713, 714, & 709 to provide strong, clean outputs.

Figure 8A:
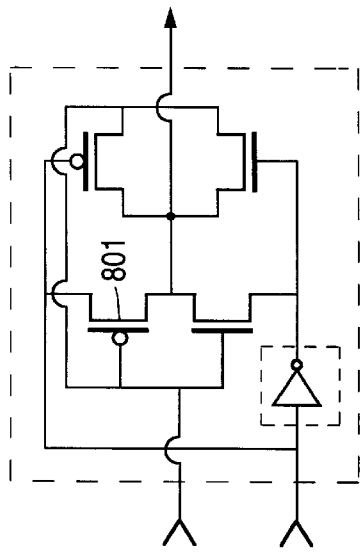
FIG. 8A shows the 6-transistor CMOS XOR implementation used in a standard 4-2 carry-save adder cell according to the present invention.
Figure 8E:
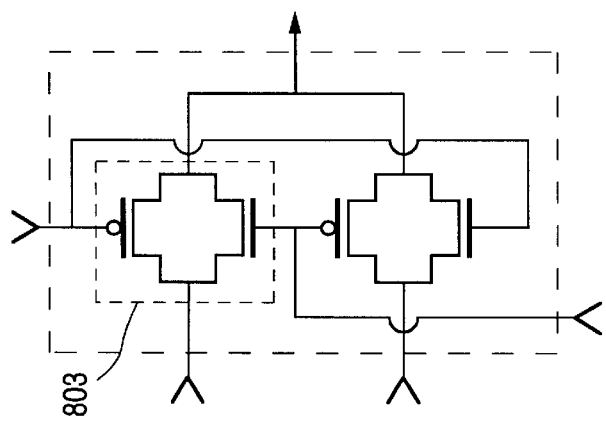
FIG. 8E shows the 4-transistor CMOS 2-to-1 multiplexor implementation used in a standard 4-2 carry-save adder cell according to the present invention.

FIG. 8A shows the implementations of the components illustrated in FIG. 7 in CMOS technology. The circuit for the XOR gates is illustrated in FIG. 8A. The XNOR gate is illustrated in FIG. 8B. The complex gate used to compute the COUT output is shown in FIG. 8C. The complex gate used to compute the CARRY output is shown in FIG. 8D. The circuit for the 2-to-1 multiplexors are illustrated in FIG. 8E. The circuit for the inverters are illustrated in FIG. 8F.

The complex gates shown in FIGS. 8C and 8D each have fifteen straightforward equivalents to the embodiments shown. For example, in FIG. 8C, the inputs to transistors 804 & 805 could be interchanged without any effect on the logical output of the gate. Each of the two pairs of series transistors and each of the two pairs of parallel transistors for each complex gate could be interchanged. The implementations shown in FIGS. 8C and 8D are thus offered as examples, not to indicate limitations.

Similarly, additional transistors may be added to any of circuit implementations shown in FIG. 8 without departing from the spirit and scope of the present invention. For example, the 2-transistor inverter shown in FIG. 8F could be transformed into a 4-transistor inverter by providing one more P-channel device and one more N-channel device, where the terminals of each of the new devices is connected to the same terminals as the corresponding old device. This is advantageous, for example, to share drains and thus decrease the output capacitance.

While the present invention has been described in terms of its presently preferred embodiments, those skilled in the art will recognize that the present invention may be practiced with modification and alteration within the spirit and scope of the appended claims. Therefore, the specifications and drawings are to be regarded in an illustrative rather than a restrictive sense.

What is claimed is:

1. A method of providing a CMOS 4-2 carry-save adder cell, taking inputs IN0, IN1, IN2, IN3, and CIN, and computing outputs SUM, CARRY, and COUT, the method comprising the steps of:

providing a first six-transistor XOR circuit taking IN0 and IN1 as inputs for computing a first intermediate value;

providing a second six-transistor XOR circuit taking IN2 and IN3 as inputs for computing a second intermediate value;

providing a six-transistor XNOR circuit taking the first and second intermediate values as inputs for computing a third intermediate value;

providing a first inverter taking the third intermediate value as input for computing a fourth intermediate value;

providing a second inverter taking CIN as input for computing a fifth intermediate value;

providing a first four-transistor 2-to-1 multiplexor circuit taking CIN and the third, fourth, and fifth intermediate values as inputs for computing a sixth intermediate value, such that the sixth intermediate value is equal to CIN if the third intermediate value is low or is equal to the fifth intermediate value if the third intermediate value is high;

providing a third inverter taking the sixth intermediate value as input for computing the SUM output;

providing a CARRY subcalculation circuit taking IN0, IN1, IN2, and IN3 as inputs for computing a seventh intermediate value;

providing a second four-transistor 2-to-1 multiplexor circuit taking the third, fourth, fifth, and seventh intermediate values as inputs for computing an eighth intermediate value;

providing a fourth inverter taking the eighth intermediate value as input for computing the CARRY output; and providing a COUT calculation circuit taking IN0, IN1, IN2, and IN3 as inputs for computing the COUT output.

2. A method of providing a CMOS 4-2 carry-save adder cell as in claim 1, wherein the step of providing a CARRY subcalculation circuit comprises the steps of:

providing a first eight-transistor complex gate taking IN0, IN1, IN2, and IN3 as inputs for computing the seventh intermediate value.

3. A method of providing a CMOS 4-2 carry-save adder cell as in claim 1, wherein the step of providing a CARRY subcalculation circuit comprises the steps of:

providing a first eight-transistor complex gate taking IN0, IN1, IN2, and IN3 as inputs for computing a ninth intermediate value;

providing a fifth inverter taking the ninth intermediate value as input for computing a tenth intermediate value; and providing a sixth inverter taking the tenth intermediate value as input for computing the seventh intermediate value.

4. A method of providing a CMOS 4-2 carry-save adder cell as in claim 3, wherein the step of providing a COUT calculation circuit comprises the steps of:

providing a second eight-transistor complex gate taking IN0, IN1, IN2, and IN3 as inputs for computing an eleventh intermediate value; and providing a seventh inverter taking the eleventh intermediate value as input for computing the COUT output.

5. A method of performing a carry-save addition, taking inputs IN0, IN1, IN2, IN3, and CIN, and computing outputs SUM, CARRY, and COUT, the method comprising the steps of:

computing a first intermediate value using a first six-transistor XOR circuit taking IN0 and IN1 as inputs;

computing a second intermediate value using a second six-transistor XOR circuit taking IN2 and IN3 as inputs;

computing a third intermediate value using a six-transistor XNOR circuit taking the first and second intermediate values as inputs;

computing a fourth intermediate value using a first inverter taking the third intermediate value as input;

computing a fifth intermediate value using a second inverter taking CIN as input;

computing a sixth intermediate value, such that the sixth intermediate value is equal to CIN if the third intermediate value is low or is equal to the fifth intermediate value if the third intermediate value is high using a first four-transistor 2-to-1 multiplexor circuit taking CIN and the third, fourth, and fifth intermediate values as inputs;

computing the SUM output using a third inverter taking the sixth intermediate value as input;

computing a seventh intermediate value using a CARRY subcalculation circuit taking IN0, IN1, IN2, and IN3 as inputs;

computing an eighth intermediate value using a second four-transistor 2-to-1 multiplexor circuit taking the third, fourth, fifth, and seventh intermediate values as inputs;

computing the CARRY output using a fourth inverter taking the eighth intermediate value as input; and computing the COUT output using a COUT calculation circuit taking IN0, IN1, IN2, and IN3 as inputs.

6. A method of performing a 4-2 carry-save addition as in claim 5, wherein the step of computing a seventh intermediate value comprises the steps of:

computing the seventh intermediate value using a first eight-transistor complex gate taking IN0, IN1, IN2, and IN3 as inputs.

7. A method of performing a 4-2 carry-save addition as in claim 5, wherein the step of computing a intermediate value comprises the steps of:

computing a ninth intermediate value using a first eight-transistor complex gate taking IN0, IN1, IN2, and IN3 as inputs;

computing a tenth intermediate value using a fifth inverter taking the ninth intermediate value as input; and computing the seventh intermediate value using a sixth inverter taking the tenth intermediate value as input.

8. A method of performing a 4-2 carry-save addition as in claim 7, wherein the step of computing the COUT output comprises the steps of:

computing an eleventh intermediate value using a second eight-transistor complex gate taking IN0, IN1, IN2, and IN3 as inputs; and computing the COUT output using a seventh inverter taking the eleventh intermediate value as input.

9. A CMOS 4-2 carry-save adder cell, taking inputs IN0, IN1, IN2, IN3, and CIN, and computing outputs SUM, CARRY, and COUT, the adder cell comprising:

a first six-transistor XOR circuit taking IN0 and IN1 as inputs for computing a first intermediate value;

a second six-transistor XOR circuit taking IN2 and IN3 as inputs for computing a second intermediate value;

a six-transistor XNOR circuit taking the first and second intermediate values as inputs for computing a third intermediate value;

a first inverter taking the third intermediate value as input for computing a fourth intermediate value;

a second inverter taking CIN as input for computing a fifth intermediate value;

a first four-transistor 2-to-1 multiplexor circuit taking CIN and the third, fourth, and fifth intermediate values as inputs for computing a sixth intermediate value, such that the sixth intermediate value is equal to CIN if the third intermediate value is low or is equal to the fifth intermediate value if the third intermediate value is high;

a third inverter taking the sixth intermediate value as input for computing the SUM output;

a CARRY subcalculation circuit taking IN0, IN1, IN2, and IN3 as inputs for computing a seventh intermediate value;

a second four-transistor 2-to-1 multiplexor circuit taking the third, fourth, fifth, and seventh intermediate values as inputs for computing an eighth intermediate value;

a fourth inverter taking the eighth intermediate value as input for computing the CARRY output; and a COUT calculation circuit taking IN0 IN1, IN2, and IN3 as inputs for computing the COUT output.

10. A CMOS 4-2 carry-save adder cell as in claim 9, wherein the CARRY subcalculation circuit comprises:

a first eight-transistor complex gate taking IN0, IN1, IN2, and IN3 as inputs for computing the seventh intermediate value.

11. A CMOS 4-2 carry-save adder cell as in claim 9, wherein the CARRY subcalculation circuit comprises:

a first eight-transistor complex gate taking IN0, IN1, IN2, and IN3 as inputs for computing a ninth intermediate value;

a fifth inverter taking the ninth intermediate value as input for computing a tenth intermediate value; and a sixth inverter taking the tenth intermediate value as input for computing the seventh intermediate value.

12. A CMOS 4-2 carry-save adder cell as in claim 11, wherein the COUT calculation circuit comprises:

a second eight-transistor complex gate taking IN0, IN1, IN2, and IN3 as inputs for computing an eleventh intermediate value; and a seventh inverter taking the eleventh intermediate value as input for computing the COUT output.

13. A CMOS 4-2 carry-save adder cell, taking inputs IN0, IN1, IN2, IN3, and CIN, and computing outputs SUM, CARRY, and COUT, the adder cell comprising:

an exclusive tree circuit taking IN0, IN1, IN2, and IN3 as inputs for computing a first intermediate value;

a first inverter taking the first intermediate value as input for computing a second intermediate value;

a second inverter taking CIN as input for computing a third intermediate value;

a first four-transistor 2-to-1 multiplexor circuit taking CIN and the first, second, and third intermediate values as inputs for computing a fourth intermediate value, such that the fourth intermediate value is equal to CIN if the first intermediate value is low or is equal to the third intermediate value if the first intermediate value is high;

a third inverter taking the fourth intermediate value as input for computing the SUM output; and a CARRY/COUT subcalculation circuit taking IN0, IN1, IN2, IN3, and the third intermediate value as inputs for computing the CARRY and COUT outputs.

14. A CMOS 4-2 carry-save adder cell, taking inputs IN0, IN1, IN2, IN3, and CIN, and computing outputs SUM, CARRY, and COUT, the adder cell comprising:

an eight-transistor complex gate taking IN0, IN1, IN2, and IN3 as inputs for computing an intermediate value, wherein the intermediate value is logically equivalent to (IN0 OR IN1) NAND (IN2 OR IN3);

an inverter taking the intermediate value as input for computing the COUT output; and a SUM/CARRY subcalculation circuit taking CIN, IN0, IN1, IN2, and IN3 as inputs for computing the SUM and CARRY outputs.

15. A CMOS 4-2 carry-save adder cell, taking inputs IN0, IN1, IN2, IN3, and CIN, and computing outputs SUM, CARRY, and COUT, the adder cell comprising:

an eight-transistor complex CMOS static gate taking IN0, IN1, IN2, and IN3 as inputs for computing a first intermediate value, wherein the first intermediate value is logically equivalent to (IN0 & IN1) NOR (IN2 & IN3);

a first inverter taking the first intermediate value as input for computing a second intermediate value;

a second inverter taking the second intermediate value as input for computing a third intermediate value; and a SUM/CARRY/COUT subcalculation circuit taking CIN, IN0, IN1, IN2, IN3, and the third intermediate value as inputs for computing the SUM, CARRY, and COUT outputs.

16. A method of providing a CMOS 4-2 carry-save adder cell, taking inputs IN0, IN1, IN2, IN3, and CIN, and computing outputs SUM, CARRY, and COUT, the method comprising the steps of:

providing a first six-transistor XOR circuit taking IN0 and IN1 as inputs for computing a first intermediate value;

providing a second six-transistor XOR circuit taking IN2 and IN3 as inputs for computing a second intermediate value;

providing a six-transistor XNOR circuit taking the first and second intermediate values as inputs for computing a third intermediate value;

providing a first inverter taking the third intermediate value as input for computing a fourth intermediate value;

providing a second inverter taking CIN as input for computing a fifth intermediate value;

providing a first four-transistor 2-to-1 multiplexor circuit taking CIN and the third, fourth and fifth intermediate values as inputs for computing a sixth intermediate value, such that the sixth intermediate value is equal to CIN if the third intermediate value is low or is equal to the fifth intermediate value if the third intermediate value is high;

providing a third inverter taking the sixth intermediate value as input for computing the SUM output;

providing a CARRY calculation circuit taking IN0, IN1, IN2, IN3, and the third intermediate value as inputs for computing the CARRY output; and providing a COUT calculation circuit taking IN0, IN1, IN2, and IN3 as inputs for computing the COUT output.

17. A method of performing a carry-save addition, taking inputs IN0, IN1, IN2, IN3, and CIN, and computing outputs SUM, CARRY, and COUT, the method comprising the steps of:

computing a first intermediate value using a first six-transistor XOR circuit taking IN0 and IN1 as inputs;

computing a second intermediate value using a second six-transistor XOR circuit taking IN2 and IN3 as inputs;

computing a third intermediate value using a six-transistor XNOR circuit taking the first and second intermediate values as inputs;

computing a fourth intermediate value using a first inverter taking the third intermediate value as input;

computing a fifth intermediate value using a second inverter taking CIN as input;

computing a sixth intermediate value, such that the sixth intermediate value is equal to CIN if the third intermediate value is low or is equal to the fifth intermediate value if the third intermediate value is high using a first four-transistor 2-to-1 multiplexor circuit taking CIN and the third, fourth, and fifth intermediate values as inputs;

computing the SUM output using a third inverter taking the sixth intermediate value as input;

computing the CARRY output using a CARRY calculation circuit taking IN0, IN1, IN2, IN3, and the third intermediate value as inputs; and computing the COUT output using a COUT calculation circuit taking IN0, IN1, IN2, and IN3 as inputs.

18. A CMOS 4-2 carry-save adder cell, taking inputs IN0, IN1, IN2, IN3, and CIN, and computing outputs SUM, CARRY, and COUT, the adder cell comprising:

a first six-transistor XOR circuit taking IN0 and IN1 as inputs for computing a first intermediate value;

a second six-transistor XOR circuit taking IN2 and IN3 as inputs for computing a second intermediate value;

a six-transistor XNOR circuit taking the first and second intermediate values as inputs for computing a third intermediate value; and an output subcalculation circuit taking CIN, the third intermediate value, IN0, IN1, IN2, and IN3 as inputs for computing the SUM, CARRY and COUT outputs, and wherein the output subcalculation circuit comprises:

a SUM calculation circuit taking CIN and the third intermediate value as inputs for computing the SUM output;

a CARRY calculation circuit taking IN0, IN1, IN2, IN3, and the third intermediate value as inputs for computing the CARRY output; and a COUT calculation circuit taking IN0, IN1, IN2, and IN3 as inputs for computing the COUT output, and wherein the SUM calculation circuit comprises:

a first inverter taking the third intermediate value as input for computing a fourth intermediate value;

a second inverter taking CIN as input for computing a fifth intermediate value;

a first four-transistor 2-to-1 multiplexor circuit taking CIN and the third, fourth, and fifth intermediate values as inputs for computing a sixth intermediate value, such that the sixth intermediate value is equal to CIN if the third intermediate value is low or is equal to the fifth intermediate value if the third intermediate value is high; and a third inverter taking the sixth intermediate value as input for computing the SUM output.

* * * * *